(12) United States Patent
Miller et al.

(10) Patent No.: US 7,231,120 B2
(45) Date of Patent: Jun. 12, 2007

(54) TAPERED OPTICAL FIBRE WITH A REFLECTIVE COATING AT THE TAPERED END

(75) Inventors: Lee D Miller, Stevenage (GB); Thomas J Richards, Stevenage (GB); James S Mulley, Ipswich (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 0 days.

(21) Appl. No.: 10/522,781

(22) PCT Filed: Jul. 15, 2003

(86) PCT No.: PCT/GB03/03081

§ 371 (c)(1),
(2), (4) Date: Jan. 28, 2005

(87) PCT Pub. No.: WO2004/011977

PCT Pub. Date: Feb. 5, 2004

(65) Prior Publication Data

US 2005/0238305 A1     Oct. 27, 2005

(30) Foreign Application Priority Data

Jul. 30, 2002 (GB) ................................. 0217538.8

(51) Int. Cl.
*G02B 6/02* (2006.01)
(52) U.S. Cl. ....................... 385/123; 385/15
(58) Field of Classification Search .............. 385/39, 385/47
See application file for complete search history.

(56) References Cited

U.S. PATENT DOCUMENTS 3,756,688 A    9/1973    Hudson et al. ........ 350/96 WG
5,640,017 A *  6/1997    Thevenin ................... 250/368

FOREIGN PATENT DOCUMENTS

| DE | 36 25 106 A1 | 2/1987 |
|----|---|---|
| EP | 0 683 408 A1 | 11/1995 |
| EP | 0 763 742 A1 | 3/1997 |
| GB | 2 003 294 A | 3/1979 |
| JP | 2251804 | * 10/1990 |
| JP | 405157917 | * 6/1993 |
| JP | 405157949 | * 6/1993 |
| JP | 7-311323 | 11/1995 |
| WO | 87/07959 | 12/1987 |
| WO | 99/60432 | 11/1999 |

OTHER PUBLICATIONS

GB Search Report.
EP Search Report.
International Search Report.

* cited by examiner

*Primary Examiner*—Michelle Connelly-Cushwa
(74) *Attorney, Agent, or Firm*—Nixon & Vanderhye P.C.

(57) ABSTRACT

An optical fibre core (39) having a reflective coating (33) along a first part of its length such that electromagnetic radiation may travel along the first part of the optical fibre by means of reflection, and further having a cladding (37) along a second part of its length, the cladding having a refractive index suitable for permitting the electromagnetic radiation to travel along the second part of the optical fibre. The invention also provides a fibre optic coupling arrangement for coupling a light pipe to a clad optical fibre, the coupling arrangement comprising a light pipe comprising an optical fibre core having a reflective coating and a clad optical fibre comprising an optical fibre core with cladding surrounding the core, the optical fibre core of the light pipe being optically joined to the optical fibre core of the clad optical fibre such that electromagnetic radiation is able to travel from the light pipe to the clad optical fibre, wherein tapered cladding is provided in the region where the light pipe is optically joined to the clad optical fibre.

11 Claims, 3 Drawing Sheets

TAPERED OPTICAL FIBRE WITH A REFLECTIVE COATING AT THE TAPERED END

This application is the US national phase of international application PCT/GB2003/003081 filed 15 Jul. 2003 which designated the U.S. and claims priority from GB 0217538.8, filed 30 Jul. 2002, the entire contents of each of which are hereby incorporated by reference.

The present invention relates to optical fibres and particularly though not exclusively to fibre-optic apparatus for detecting electromagnetic radiation.

Arrays of fibre optic cables are often used in electromagnetic radiation detectors. Each fibre has one exposed end so that electromagnetic radiation travelling from the direction in which the exposed fibre end is pointing passes into the fibre and then travels along its length. At the other end of the fibre is a sensor which may detect, for example, the wavelength or intensity of particular bandwidths of electromagnetic radiation, depending upon the desired application, e.g. infra-red detectors, visible detectors etc. Such detectors are directional in that each fibre is only able to detect radiation approaching from the general direction in which the fibre is pointing.

Therefore it is desirable and usual to have numerous fibres arranged in an array, so that a greater number of directions may be covered by a detector.

Conventional optical fibres comprise a central fibre core surrounded by cladding. Conventional fibre optic arrays comprise a number of clad fibres. The fibres are arranged in a matrix form to create the array, with each fibre being placed as physically close as possible to neighbouring fibres. This permits the amount of 'dead space', which is the space on the array where radiation cannot be guided into a fibre, to be minimised.

A disadvantage of the known fibre optic arrays is that, due to the cladding, the fibre cores are spaced relatively far apart. Therefore a significant proportion of the array is 'dead space'.

This is a particular problem where relatively weak electromagnetic radiation needs to be detected. For example, a missile may carry a small lightweight and therefore relatively weak laser on board for illuminating targets. The missile may also carry an electromagnetic radiation detector comprising arrays for receiving the electro-magnetic radiation reflected from the target. Because the laser used to illuminate the target is relatively weak, the reflected signals will be very weak, and therefore it is desirable that as much returned radiation as possible is captured by the fibres of the array.

According to the present invention there is provided an optical fibre core having a reflective coating along a first part of its length such that electromagnetic radiation may travel along the first part of the optical fibre by means of reflection, and further having a cladding along a second part of its length, the cladding having a refractive index suitable for permitting the electromagnetic radiation to travel along the second part of the optical fibre.

The reflective coating is preferably a metallic coating. Alternatively a reflective polymer material or a semiconductor material may be used instead. As the reflective coating only needs to be a very thin layer of approximately 100 nm, the coated fibres are significantly thinner than the conventional optical fibres previously described. Therefore, the coated fibres can be packed more densely than the conventional optical fibres, thus significantly reducing the 'dead space' on the optical fibre array.

In some circumstances during manufacture, eg during drawing of fibres, a thin layer of cladding may remain on the fibre core. In such circumstances it may be necessary to provide a reflective coating on the outer surface of the cladding to ensure that the electromagnetic radiation may still travel along the first part of the optical fibre by means of reflection.

Preferably at least part of the outside surface of the cladding is coated in a reflective coating. The reflective coating is advantageously present in the region close to said first part of the fibre. This helps to prevent losses of electromagnetic radiation in the region where the first, coated part of the fibre and the second, clad part of the fibre meet.

The cladding may be tapered along part of its length, the thin part of the taper being adjacent the first, coated part of the fibre.

Advantageously, the tapered portion of the cladding has a reflective coating on the outside surface of the cladding. The reflective coating may be thickest at the thin part of the taper.

The first part of the optical fibre may have a core of a different cross-section to the second part of the optical fibre. The core advantageously tapers to a larger cross-section in the second part of the optical fibre. The first part of the optical fibre may additionally or alternatively have a core of different cross-sectional shape to the second part of the optical fibre. The first part of the optical fibre may additionally or alternatively have a core of a different material to the second part of the optical fibre.

According to the present invention in another aspect thereof, there is provided a fibre optic coupling arrangement for coupling a light pipe to a clad optical fibre, the coupling arrangement comprising a light pipe comprising an optical fibre core having a reflective coating and a clad optical fibre comprising an optical fibre core with cladding surrounding the core, the optical fibre core of the light pipe being optically joined to the optical fibre core of the clad optical fibre such that electromagnetic radiation is able to travel from the light pipe to the clad optical fibre, wherein tapered cladding is provided in the region where the light pipe is optically joined to the clad optical fibre.

The length and shape of the taper may be designed to encourage the electromagnetic radiation to propagate in a desired mode.

Advantageously, the tapered cladding is at least partially coated with a reflective coating. It is particularly advantageous to coat the thinnest region of the tapered cladding with the reflective coating to prevent loss of radiation.

According to the present invention in another aspect thereof, there is provided an array of optical fibres, each optical fibre comprising an optical fibre core having a reflective coating along a first part of its length such that electromagnetic radiation may travel along the first part of the optical fibre by means of reflection, and further having a cladding along a second part of its length, the cladding having a refractive index suitable for permitting the electromagnetic radiation to travel along the second part of the optical fibre.

The clad part of each of the optical fibres may terminate, for example, in an electromagnetic radiation detection device.

The present invention will now be described by way of example only and with reference to the following drawings.

Figure 1:
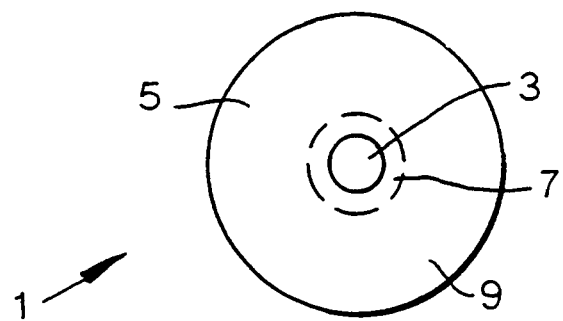
FIG. 1 shows a front view of the end of a conventional clad optical fibre.

FIG. 1 shows an optical fibre arrangement 1 comprising an optical fibre core 3 which is clad in a cladding material 5. The cladding material 5 has an appropriate refractive index so that radiation incident on the exposed end of fibre core 3 travels along fibre 1 by means of one or more guided modes. Some radiation incident on the cladding 7 adjacent to the fibre core 3 may be coupled into a guided mode. Radiation falling on the outer part of the cladding 9 will not become a guided mode, and will not propagate along the fibre 1.

Figure 2:
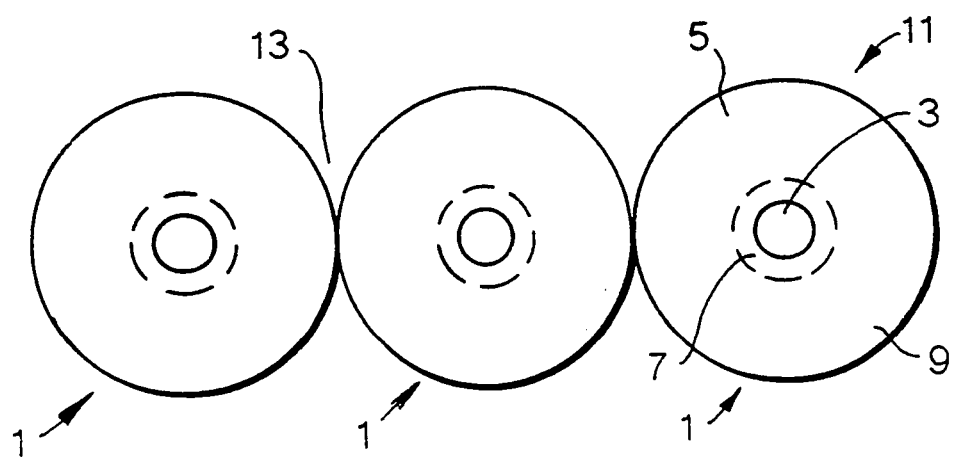
FIG. 2 shows a front view of a conventional optical fibre array.

FIG. 2 shows a fibre optic array 11 comprising several optical fibres 1 as described with reference to FIG. 1. The optical fibres 1 are packed together as tightly as possible. Any electromagnetic radiation falling on the array has to fall either on the end of the fibre core 3 or the inner part of the cladding 7 to be able to travel along the fibre 1 and therefore be detected. It can be seen that there is a large area of the array which cannot be used for detecting radiation, namely the area 13 between optical fibres 1, and the area of the outer part of the cladding 9 of the optical fibres 1. The 'dead-space' (non-detecting) areas are 9 and 13.

Figure 3:
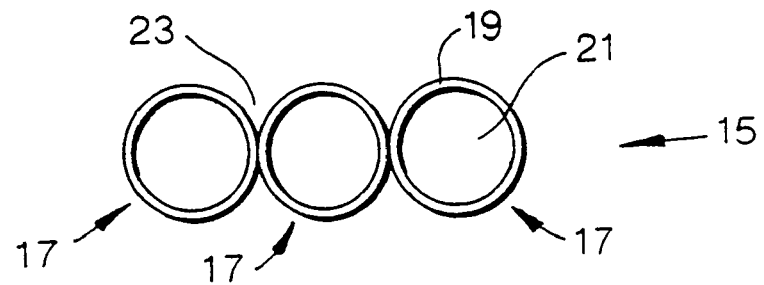
FIG. 3 shows a front view of an optical fibre array in accordance with the present invention.

FIG. 3 shows an optical fibre array 15, which comprises several optical fibres 17. Each optical fibre 17 has a reflective coating 19 around the fibre core 21. The reflective coating 19 is very much thinner than the cladding, (typically 2–3 orders of magnitude) and allows electromagnetic radiation to travel along the fibre core 21 by reflection off the reflective coating.

As the reflective coating is significantly thinner than the cladding, a greater number of optical fibres 17 can be put in an area of the same size relative to the optical fibres 1 of FIGS. 1 and 2.

This means that the ratio of non-detecting areas 19 (reflective coating) and 23 (area between the optical fibres 17) to detecting areas 21 is much lower than for the conventional array 11. As more of the radiation falling upon the array is received by the optical fibres 17 than for the conventional array 11, more radiation reaches the sensor part of the detector. Therefore for weak sources of radiation, there is more chance of detection.

Figure 4:
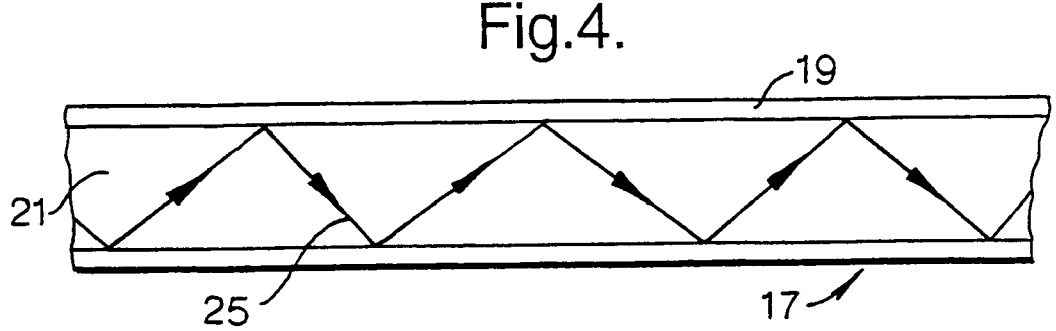
FIG. 4 shows a longitudinal cross-sectional view of part of an optical fibre of the array of FIG. 3.

FIG. 4 shows the optical fibre 17. The path 25 of radiation travelling from the exposed end of the fibre 21 towards the sensor part of the detector (not shown) is shown. The radiation is reflected by the reflective coating 19.

Figure 5:
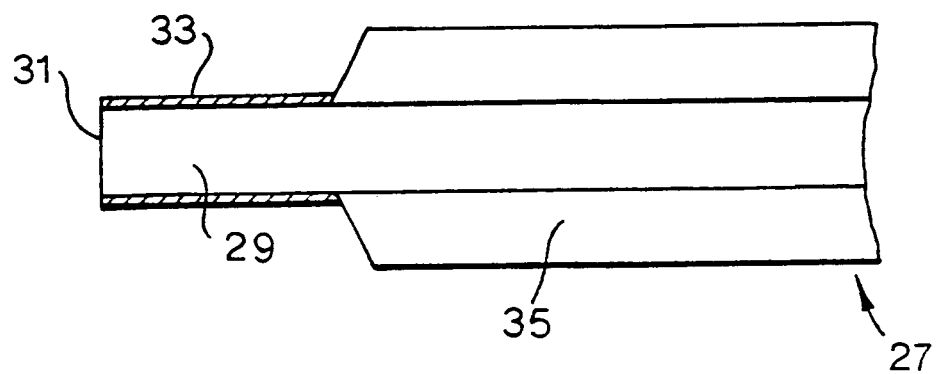
FIG. 5 shows a longitudinal cross-sectional view of an optical fibre in accordance with the present invention in a first embodiment thereof.

FIG. 5 shows an optical fibre 27 comprising a fibre core 29 having an exposed end 31. The part of the fibre core 29 adjacent the exposed end 31 is coated in a reflective material 33. The rest of the fibre core 29 is clad in a cladding material 35, which has an appropriate refractive index. This design of optical fibre allows the exposed ends 31 of a plurality of optical fibres 27 to be packed tightly together into an array such as that described with reference to FIG. 3 whilst allowing the rest of the optical fibre to be a conventional fibre waveguide. This is advantageous as such waveguides are readily available, and relatively inexpensive, compared with rare metal light pipes.

Figure 6:
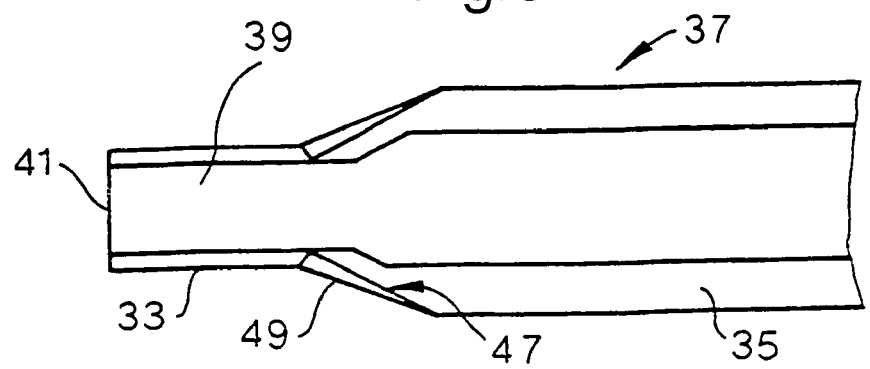
FIG. 6 shows a longitudinal cross-sectional view of an optical fibre of a second embodiment.

FIG. 6 shows an optical fibre 37 comprising a fibre core 39 having an exposed end 41. The part of the fibre core 39 adjacent the exposed end 41 is coated in the reflective material 33. The rest of the fibre core 39 is clad in the cladding material 35. The cladding material 35 is tapered adjacent to the reflectively-coated part of the optical fibre, and the tapered outside surface 47 of the cladding 35 is coated in a reflective material 49 which may be the same as reflective material 33. The reflective coating 49 prevents radiation being lost through the relatively thin cladding at the taper 47. Any radiation which reaches the outside surface 47 of the cladding is reflected back into the cladding 35. The reflective coating 49 may be of constant thickness along the length of the taper 47, or may instead decrease in thickness as the thickness of cladding 35 increases along the taper 47, as shown in FIG. 6. The taper 47 encourages radiation to propagate in desired modes. In this example, the fibre core 39 is shown increasing in cross-section in the region of the taper 47, however, the fibre core 39 may retain the same cross-section throughout the tapered region if desired.

Figure 7:
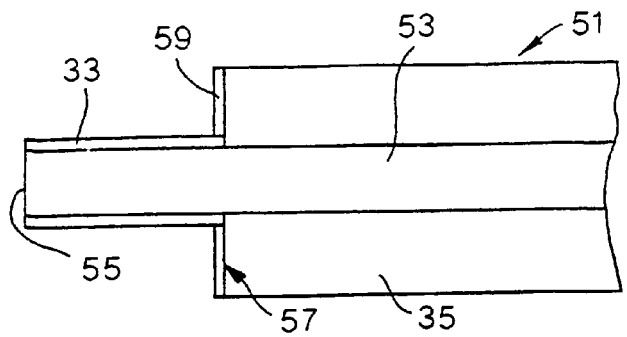
FIG. 7 shows a longitudinal cross-sectional view of an optical fibre of a third embodiment.

FIG. 7 shows an optical fibre 51 comprising a fibre core 53 having an exposed end 55. The part of the fibre core 53 adjacent the exposed end 55 is coated in the reflective material 33. The rest of the fibre 53 is clad in the cladding material 35. The cladding material this time is not tapered adjacent the reflectively-coated part of the optical fibre, however the end face of the cladding 57 is coated in a reflective material 59 which may be the same as reflective material 33.

Figure 8:
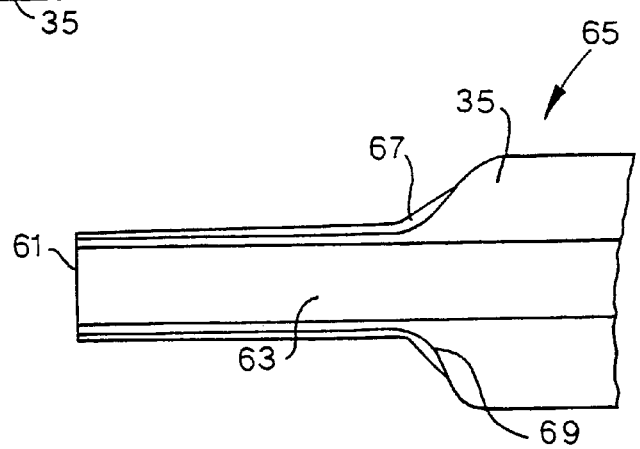
FIG. 8 shows a longitudinal cross-sectional view of an optical fibre of a fourth embodiment.

FIG. 8 shows an optical fibre 65 comprising a fibre core 63 having an exposed end 61. The fibre is clad along its length, the cladding 35 being significantly thinner near the exposed end 61 of the optical fibre 65, and being tapered 69. A coating of reflective material 67 is applied to the outer surface of exposed end of the fibre 61 and the taper 69). This allows radiation to propagate along the fibre in the region of the exposed fibre end 61 by means of reflection provided that the cladding is sufficiently thin.

Figure 9:
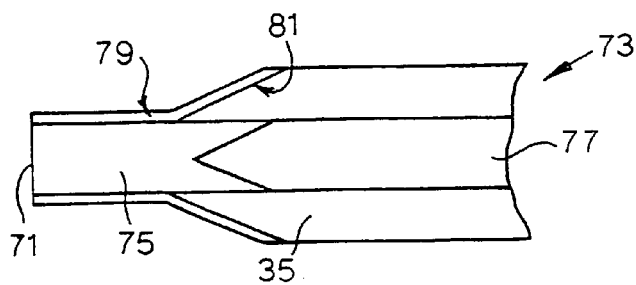
FIG. 9 shows a longitudinal cross-sectional view of an optical fibre of a fifth embodiment.

FIG. 9 shows an optical fibre 73 comprising a fibre core 75, 77 having an exposed end 71. The part of the fibre core 75 adjacent the exposed end 71 is coated in the reflective material 79. The rest of the fibre core 77 is clad in the cladding material 35. The cladding material 35 is tapered adjacent to the reflectively-coated part of the optical fibre, and the tapered outside surface 81 of the cladding 35 is coated in the reflective material 79. The reflective coating 79 prevents radiation being lost through the relatively thin cladding at the taper 81. Any radiation which reaches the tapered outside surface 81 of the cladding 35 is reflected back into the cladding 35. The reflective coating 79 may be of constant thickness along the length of the taper 81, as shown in FIG. 9, or may instead decrease in thickness as the thickness of cladding 35 increases along the taper 81 (as shown in FIG. 6). The taper 81 encourages radiation to propagate in desired modes. In this example, the fibre core 75, 77 is formed from two different materials, the materials joining in the region of the taper 81, and the fibre core 75, 77 being designed to allow radiation to propagate along its length without significant losses in the region of the taper 81. This allows one material to be used as a lightpipe, and a different material to be used as a fibre core in the clad fibre, where different modes of propagation are required. In this example, the fibre core 75, 77 is shown to retain the same cross-section throughout the region of the taper 81.

Figure 10:
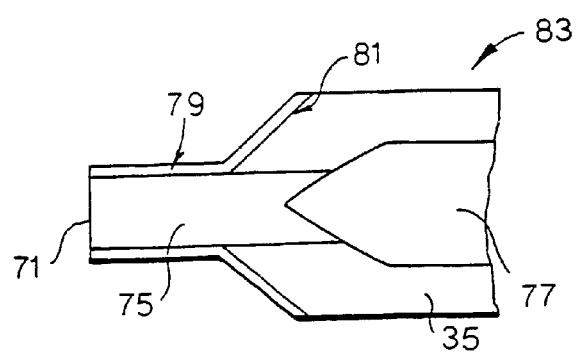
FIG. 10 shows a longitudinal cross-sectional view of an optical fibre of a sixth embodiment.

FIG. 10 shows an optical fibre 83 having similar characteristics to the optical fibre 73 of FIG. 9, similar features having the same reference numerals as in FIG. 9. However, in this example the fibre core 75, 77 is shown to increase in cross-section in the region of the taper 81. The shape and size of the taper is chosen to encourage propagation of the radiation along the fibre core 77 in the desired modes.

It will be apparent to one skilled in the art that different embodiments of the present invention are possible, several of which are described herein. The scope of the invention covers the embodiments which utilise the same principles as those described herein.

The invention claimed is:

1. An optical fibre having a core comprising:
   a first longitudinal portion of generally constant cross-sectional area and covered by an inwardly facing reflective coating to cause electromagnetic radiation to travel along the first longitudinal portion of the core by means of internal reflection, and
   a second longitudinal portion covered by a cladding material having a refractive index suitable for guiding the electromagnetic radiation along the second longitudinal portion of the core, wherein the cross-sectional area of the first longitudinal portion of the core and its associated coating is less than the cross-sectional area of the second longitudinal portion of the core and its associated cladding, wherein the end of the cladding material is tapered and the thinnest portion of the taper is directed towards the first portion of the core.

2. An optical fibre, as in claim 1, in which an intermediate longitudinal portion of the core is positioned between the first and second longitudinal portions, an end of the cladding material terminates in the intermediate longitudinal portion, and at least part of the exterior of the cladding material of the intermediate portion is covered by an inwardly facing reflective coating.

3. An optical fibre, as in claim 1, in which the exterior of the tapered end of the cladding material has an inwardly facing reflective coating.

4. An optical fibre, as in claim 3, in which the reflective coating is thickest at the thinnest part of the taper.

5. An optical fibre, as in claim 1, in which a layer of cladding material is positioned between the core and the reflective coating of the first longitudinal portion, this layer of cladding material being substantially thinner than the cladding of the second portion of the core and sufficiently thin to permit electromagnetic radiation to travel along the first portion of the core by internal reflection.

6. An optical fibre, as in claim 1, in which the first portion of the core has a different cross-section to the second portion of the core.

7. An optical fibre, as in claim 1, in which the first and second longitudinal portions of the core are formed from different materials.

8. An array of optical fibres comprising a plurality of optical fibres according to any preceding claim, in which the first longitudinal portions of the optical fibres are arranged closely side-by-side.

9. An array of optical fibres, as in claim 8, in which one end of each of the optical fibres terminates in an electromagnetic radiation detection device.

10. A fibre optic coupling arrangement for coupling a light pipe to a clad optical fibre, the coupling arrangement comprising
    a light pipe comprising an optical fibre core having a reflective coating; and
    a clad optical fibre comprising an optical fibre core with cladding surrounding the core, the optical fibre core of the light pipe being optically joined to the optical fibre core of the clad optical fibre such that electromagnetic radiation is able to travel from the light pipe to the clad optical fibre, wherein tapered cladding is provided in the region where the light pipe is optically joined to the clad optical fibre, wherein the cladding is a material having a refractive index suitable for guiding electromagnetic radiation along the clad optical fibre.

11. A fibre optic coupling arrangement as in claim 10, in which the tapered cladding material is at least partially covered by an inwardly facing reflective coating.

* * * * *